(12) United States Patent
Lee

(10) Patent No.: US 7,975,274 B2
(45) Date of Patent: Jul. 5, 2011

(54) OPTICAL DISC LOADING APPARATUS OF OPTICAL DISC PLAYER CAPABLE OF LOADING DISCS OF DIFFERENT SIZES

(75) Inventor: Hwan Seung Lee, Yongin-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1225 days.

(21) Appl. No.: 11/488,729

(22) Filed: Jul. 19, 2006

(65) Prior Publication Data

US 2007/0174857 A1    Jul. 26, 2007

(30) Foreign Application Priority Data

Sep. 26, 2005   (KR) .................. 10-2005-0089555

(51) Int. Cl.
*G11B 17/04* (2006.01)
(52) U.S. Cl. ...................................... 720/624
(58) Field of Classification Search .............. 720/619, 720/624
See application file for complete search history.

(56) References Cited

U.S. PATENT DOCUMENTS

| 5,056,077 | A  | * | 10/1991 | Morikawa et al. | 720/624 |
| 6,839,898 | B2 | * | 1/2005  | Saji et al.     | 720/619 |
| 7,140,030 | B2 | * | 11/2006 | Togawa          | 720/623 |

FOREIGN PATENT DOCUMENTS

KR    10-433415    5/2004

OTHER PUBLICATIONS

English language abstract issued Jun. 10, 2002 for Korean Patent Abstract Publication No. 2003-94927 A.

* cited by examiner

*Primary Examiner* — David D Davis
(74) *Attorney, Agent, or Firm* — Stanzione & Kim, LLP

(57) ABSTRACT

A disc loading apparatus of an optical disc player includes components of a loading mechanism interacting with each other and steadily performing multiple functions such that reliability of loading/unloading of an optical disc enhanced and the number of components is reduced. The disc loading apparatus includes a main frame having a loading motor loading optical discs of different sizes to a chucking position, a base plate, a guide lever guiding the optical discs to the chucking position, a locking lever selectively locking/releasing the guide lever according to the disc loading position, a slider reciprocating in the loading/unloading directions of the optical disc and selectively receiving a driving force of the loading motor according to the traveling positions, and a connector rotating and translating to move in association with the guide lever, the slider, and the locking lever. The connector transfers the movement of the guide lever to the slider.

27 Claims, 10 Drawing Sheets

OPTICAL DISC LOADING APPARATUS OF OPTICAL DISC PLAYER CAPABLE OF LOADING DISCS OF DIFFERENT SIZES

CROSS-REFERENCE TO RELATED APPLICATIONS

This application claims the benefit of Korean Patent Application No. 2005-89555, filed on Sep. 26, 2005, in the Korean Intellectual Property Office, the disclosure of which is incorporated herein by reference.

BACKGROUND OF THE INVENTION

1. Field of the Invention

Aspects of the present invention relate to an optical disc loading apparatus of an optical disc player, and more particularly, to an optical disc loading apparatus for directly inserting an optical disc without a tray for disc loading.

2. Description of the Related Art

An optical disc player projects a light beam onto an optical disc such as a compact disc to record information and to reproduce information recorded in the optical disc, and generally includes a disc loading apparatus for loading the optical disc to a position for recording and reproducing information in and from the optical disc. In particular, in a portable disc player or a vehicle disc player, the optical disc is directly inserted and loaded without a tray for the disc loading because of lack of space. Moreover, there are disc loading apparatuses for selectively loading optical discs with different sizes, such as 80 mm optical discs and 120 mm optical discs.

An example of such an optical disc loading apparatus is disclosed in Korean Registered Patent No. 433415. The disc loading apparatus described in the patent includes a power transmission unit for transmitting a driving force of a loading motor to a transfer roller to transfer the optical disc, a slider selectively connected to the power transmission unit to reciprocate, a first interlock mechanism including a first rotation plate, a second rotation plate, and a first pushing lever, guiding a first relatively large-sized disc to a loading finish position, and moving the slider to be connected to the power transmission unit, a second interlock mechanism including a second pushing lever and connecting the slider to the power transmission when a second relatively small-sized disc is loaded, a sub-chassis for spacing the first interlock mechanism from the first disc or the second disc positioned at the loading finish position, and a locking lever for locking and releasing the first interlock mechanism.

However, according to the conventional optical disc loading apparatus, there is a separate set of mechanisms for loading a larger disc and for loading a smaller disc. Every component has a simple function so that the number of the components must be increased, and the loading mechanism becomes complicated. For example, the first pushing lever and the second pushing lever are independently provided to perform similar functions and to be respectively applied to the different sized optical discs. The first pushing lever and the second pushing lever transmit the movement of the second rotation plate to the slider during the loading, but do not transmit the movement of the slider to the second rotation plate. Thus, there is an additional component, the sub-chassis, for receiving the movement of the slider and for spacing the first interlock mechanism away from the disc positioned at the loading finish position.

As the number of the components for forming the loading mechanism increases, and productivity decreases. More seriously, the disc loading and unloading becomes unreliable. In other words, when many components are installed in a small space, there is an increased probability of malfunctions due to interference between the many components. Even in the conventional loading apparatus, since the second pushing lever has a different arc of movement when loading and unloading the optical disc, the second pushing lever may interfere with the slider moving in the opposite direction to the second pushing lever during the disc unloading.

Moreover, according to the conventional optical disc loading apparatus, since the locking lever only rotates, a protrusion of the locking lever cannot be smoothly removed from a groove of the second rotation plate when the locking lever is rotated by the sub-chassis to release the second rotation plate.

SUMMARY OF THE INVENTION

Aspects of the present invention provide a disc loading apparatus of an optical disc player in which components of a loading mechanism can steadily perform multiple functions such that loading and reliable unloading of an optical disc can be performed with a minimal number of components.

Additional aspects and/or advantages of the invention will be set forth in part in the description which follows and, in part, will be obvious from the description, or may be learned by practice of the invention.

In accordance with one aspect, the present invention provides an optical disc loading apparatus of an optical disc player including a main frame in which a loading motor is installed to load an optical disc in a loading direction to a chucking position, wherein the optical disc is selectively either an optical disc having a first diameter or an optical disc having a second diameter greater than the first diameter. The disc loading apparatus includes a base plate, a guide lever mechanism rotatably installed in the base plate to guide the optical disc to the chucking position when the optical disc enters the optical disc player, a locking lever rotatably installed in the base plate to selectively lock and release the guide lever mechanism according to the position where the optical disc is located, a slider installed in the main frame to reciprocate in the loading direction of the optical disc and in an unloading direction opposite to the loading direction, and selectively receiving a driving force of the loading motor according to where the slider is positioned, and a connector installed to rotate and to translate in the base plate and moving in association with the guide lever mechanism, the slider, and the locking lever.

Preferably, the guide lever mechanism includes a first guide lever selectively locked and released by the locking lever, and a second guide lever that rotates in association with the first guide lever. The first guide lever and the second guide lever respectively have guide protrusions that precisely guide the entering optical disc to the chucking position.

The first guide lever acts upon the connector so that the connector induces the slider to move linearly, and the slider acts upon the connector so that the connector induces the first guide lever to rotate such that the guide protrusion is spaced apart from an optical disc positioned at the chucking position.

The connector includes a rotation shaft that protrudes from a central portion thereof, and the base plate includes a first longitudinal hole in which the rotation shaft is inserted such that the connector rotates and translates in a direction perpendicular to the loading direction of the optical disc.

The connector further includes a cam protrusion that protrudes from one end thereof toward the first guide lever, and the first guide lever includes a cam slit that engages with the cam protrusion such that the connector and the first guide lever rotate in association with each other.

The cam slit includes a first slit portion interacting with the cam protrusion when the optical disc having the first diameter is loaded, a second slit portion interacting with the cam protrusion when the optical disc having the second diameter is loaded, and a third slit portion formed between the first slit portion and the second slit portion such that the cam protrusion moves from the first slit portion to the second slit portion when the optical disc having the second diameter is loaded.

The slider includes a slider recess into which an opposite end of the connector is inserted, and the opposite end of the connector pushes one side of the slider recess when the first guide lever and the connector rotate such that the slider receives the driving force of the loading motor, and is pushed to the opposite side of the slider recess as the slider moves to rotate the connector and the first guide lever.

The locking lever is installed to rotate and to translate and includes a rotation shaft that protrudes toward the base plate. The base plate includes a second longitudinal hole into which the rotation shaft is inserted.

To this end, the slider induces the first guide lever to rotate and the locking lever to translate such that the locking protrusion is easily separated from the first guide lever.

The slider includes a protrusion that protrudes toward the locking lever, and the locking lever includes a first interfering pin that interacts with the protrusion as the slider moves.

Moreover, the locking lever includes a locking protrusion that restricts the first guide lever, and the first guide lever includes a first locking recess, provided in the circumference, into which the locking protrusion is inserted to determine the chucking position of the optical disc having the first diameter, and a second locking recess, spaced apart from the first locking recess, into which the locking protrusion is inserted to determine the chucking position of the optical disc having the second diameter.

The first locking recess and the locking protrusion are structured such that rotation of the first guide lever is constrained to a predetermined angle when the locking protrusion is inserted into the first locking recess.

Moreover, the locking lever includes a second interfering pin formed in one end thereof to interfere with an optical disc having the second diameter to rotate the locking lever in the direction where the first guide lever is released when the optical disc having the second diameter enters.

As the second interfering pin interferes with the optical disc having the second diameter to rotate the locking lever, an opposite end of the locking lever pushes the connector to move the cam protrusion from the first slit portion to the third slit portion such that the first guide lever is enabled to rotate.

In accordance with one aspect, the present invention provides an optical disc loading apparatus of an optical disc player including a main frame in which a loading motor is installed to load an optical disc in a loading direction to a chucking position, wherein the optical disc is selectively either a optical disc having a first diameter or an optical disc having a second diameter greater than the first diameter. The disc loading apparatus includes a base plate, a guide lever rotatably installed in the base plate to guide the optical disc to the chucking position when the optical disc enters, a slider installed in the main frame to reciprocate and receiving the movement of the guide lever mechanism and a driving force of the loading motor when the optical disc reaches a loading finish position and starting to linearly move, a locking lever installed to rotate and to translate in the base plate to selectively lock and release the guide lever mechanism according to the position where the optical disc is located and in response to movement of the slider, and a connector installed to rotate and to translate in the base plate and moving in association with the guide lever mechanism, the slider, and the locking lever.

In accordance with another aspect, the present invention comprises An optical disc loading apparatus of an optical disc player that loads an optical disc in a loading direction to a chucking position, wherein the optical disc is selectively either a first optical disc having a first diameter or a second optical disc having a second diameter greater than the first diameter, the disc loading apparatus comprising: a base plate; a guide lever mechanism rotatably installed in the base plate, the guide lever mechanism including a first guide lever and a second guide lever that counter-rotates in association with the first guide lever; wherein the first guide lever and the second guide lever respectively have guide protrusions that guide an entering optical disc to the chucking position, a locking lever rotatably installed in the base plate to selectively lock and release the guide lever mechanism according whether the first disc or the second disc is loaded; a slider that selectively receiving a driving force of a loading motor according to where the slider is positioned; and a connector installed to rotate and to translate in the base plate and moving in association with the guide lever mechanism, the slider, and the locking lever, wherein the guide lever mechanism rotates between a first position to which the guide lever mechanism is biased when no disc is inserted, a second position in which the guide protrusions interfere with the first optical disc to guide the first optical disc to the chucking position, a third position in which the guide protrusions are spaced apart from the first optical disc in the chucking position, a fourth position in which the guide protrusions interfere with the second optical disc to guide the second optical disc to the chucking position and a fifth position wherein the guide protrusions are spaced apart from the second optical disc in the chucking position, wherein in the first and second position, a locking projection of the locking lever locks the guide lever mechanism in a first locking recess in the first guide lever and wherein in the fourth position, the locking projection locks the guide lever mechanism in a second locking recess wherein if the first optical disc is loaded, the first optical disc moves the guide lever mechanism from the first position to the second position, wherein the first guide lever moves the connector which moves the slider to receive a driving force of the loading motor, which moves the slider, which moves the locking lever to unlock the locking lever from the first locking recess of the first guide lever and moves the connector, which moves the guide lever mechanism to the third position and wherein if a second optical disc is loaded, the second optical disc interacts with the locking lever to unlock the locking lever from the first guide lever and moves the guide lever mechanism from the first position to the fourth position, wherein the first guide lever moves the connector which moves the slider to receive a driving force of the loading motor, which moves the slider, which moves the locking lever to unlock the locking lever from the second locking recess of the first guide lever and moves the connector, which moves the guide lever mechanism to the fifth position.

In accordance with another aspect, the present invention comprises A method of loading an optical disc to a chucking position in an optical disc player, wherein the optical disc is selectively either a first optical disc having a first diameter or a second optical disc having a second diameter greater than the first diameter, the method comprising, loading the optical disc to move in a loading direction toward a chucking position in the optical disc player wherein, if the first optical disc is loaded, the optical disc contacts first and second guide protrusions extending from first and second guide levers, respectively, wherein the first and second guide protrusions guide the optical disc to a chucking position, and wherein the optical disc interacts with the first guide protrusion to cause the first guide lever to rotate to move a connector that moves a slider into a position wherein the slider is driven by a driving motor, wherein the driven slider interacts with a locking lever that restricts rotation of the first guide lever in a first locking position to release the first guide lever from the locking lever and wherein the driven slider further interacts with the connector to move the first and second guide levers so that the first and second guide protrusions are spaced apart from the optical disc having the first diameter in the chucking position and wherein if the second optical disc is loaded, the optical disc interacts with an interfering pin of the locking lever to release the locking lever from the first locking position before the first and second guide protrusions are contacted by the optical disc and wherein the optical disc further moves in the loading direction to contact first and second guide protrusions causing the first guide lever rotate until the locking lever engages the first guide lever in a second locking position, wherein the first and second guide protrusions precisely guide the optical disc to the chucking position, and wherein the first guide lever moves the connector that moves the slider into a position wherein the slider is driven by the driving motor, wherein the slider interacts with the locking lever to release the first guide lever from the locking lever in the second locking position and wherein the slider further interacts with the connector to move the first and second guide levers so that the first and second guide protrusions are spaced apart from the optical disc having the second diameter in the chucking position.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
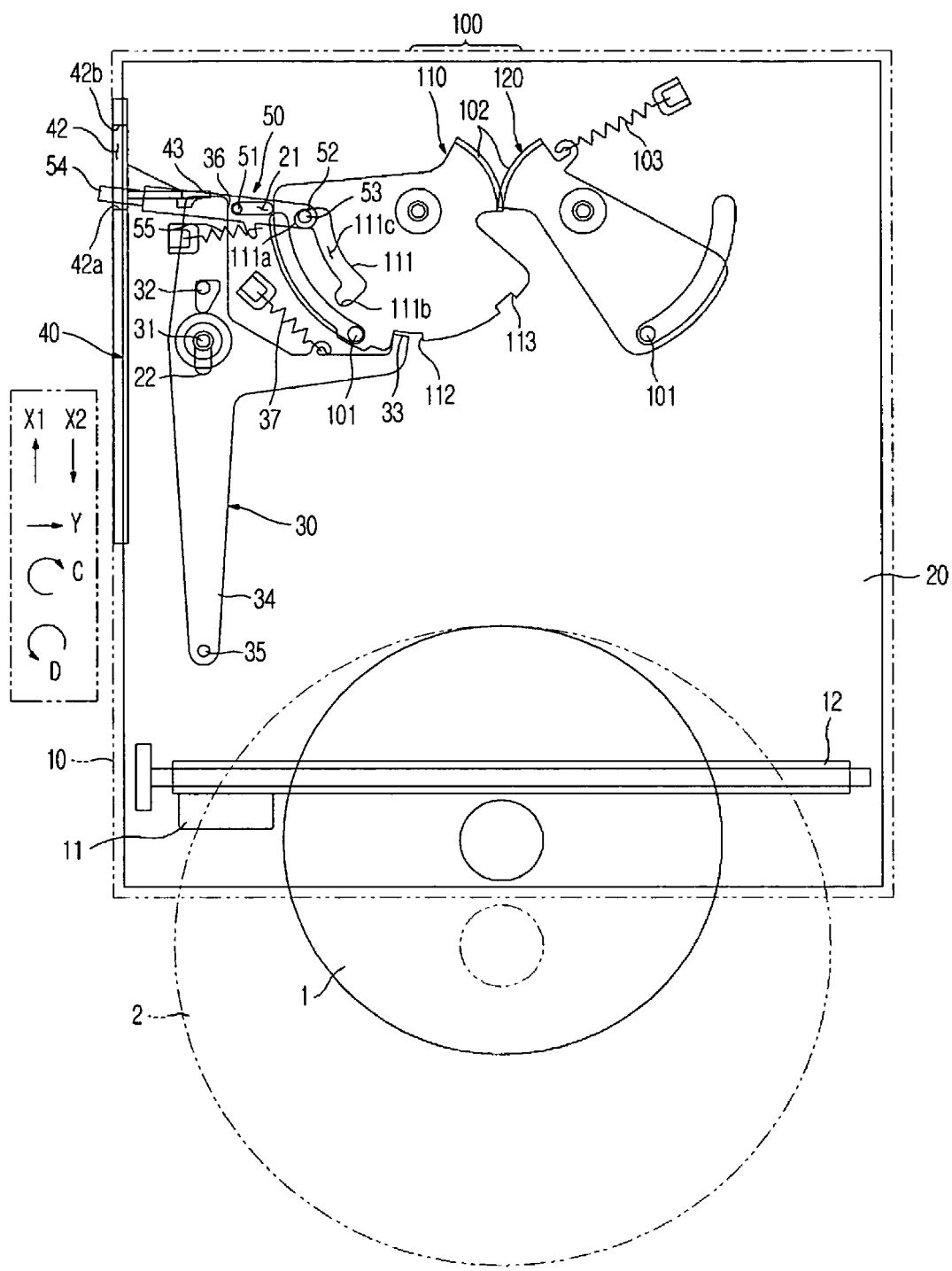
FIGS. 1 to 3 are a plane view, a side view, and a front view, respectively, schematically illustrating a disc loading apparatus of an optical disc player according to a preferred embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
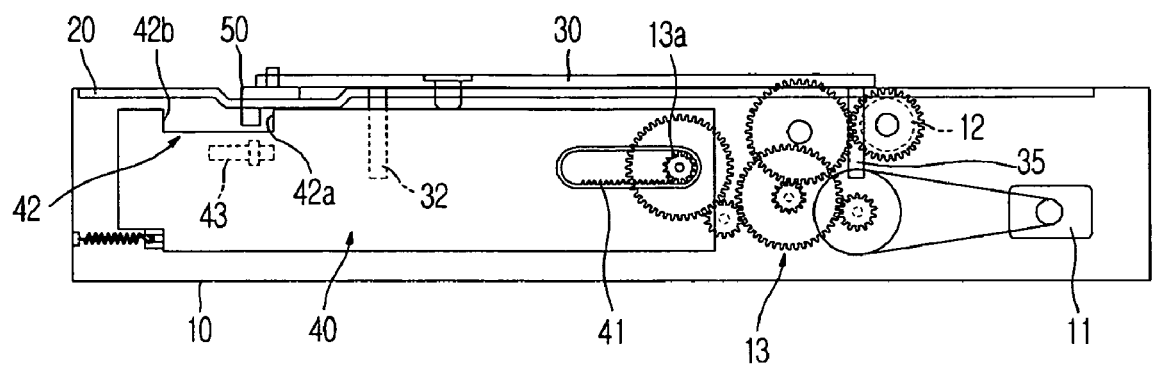
Figure 3:
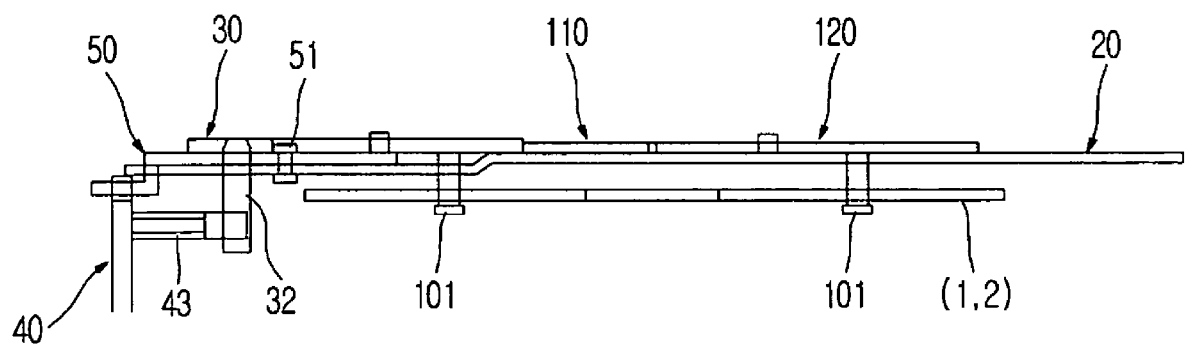

FIGS. 1 to 3 are a plane view, a side view, and a front view, respectively, schematically illustrating a disc loading apparatus of an optical disc player according to an embodiment of the present invention. Hereinafter, for the sake of convenience, a direction of loading and unloading an optical disc is referred to as an X-direction, a direction perpendicular to the X-direction is referred to as a Y-direction, a clockwise direction of rotation is referred to as a C-direction, and a counterclockwise direction of rotation is defined as the a D-direction. The X-direction is divided into an X1-direction, which is the loading direction of the optical disc, that is, the direction that the optical disc moves as the optical disc enters the optical disc player during loading, and an X2-direction, which is in the direction opposite to the X1-direction.

As shown in FIGS. 1 to 3, the disc loading apparatus of the optical disc player according to the preferred embodiment of the present invention includes a main frame 10 in which a loading motor 11 is installed to supply a driving force to selectively load a first optical disc 1, that is, an optical disc having a first diameter, or a second optical disc 2, that is, an optical disc having a second diameter greater than the first diameter, and a base plate 20, installed above the main frame 10, in which various components for constituting a mechanism for loading the optical discs. Herein, the term "optical disc" may be used alone when it is not necessary to specify a specific size of disc. The term "first optical disc" refers to the optical disc having the first diameter, and the term "second optical disc" refers to the disc having the second diameter greater than the first diameter. Typically, the first optical disc 1 is an 80 mm optical disc, and the optical disc 2 is a 120 mm optical disc, although the invention is not limited to these sizes.

Further, the disc loading apparatus includes a guide lever mechanism 100 installed to rotate in the base plate 20, a locking lever 30 for selectively locking and releasing the movement of the guide lever mechanism 100 according to the size and position of the loaded optical disc, a slider 40 for selectively receiving the driving force of the loading motor 11 according to where the slider 40 is positioned to linearly reciprocate in the X-direction, and a connector 50 installed in the base plate 20 to rotate and to translate and which is moved in association with the movements of the guide lever mechanism 100, the slider 40, and the locking lever 30.

The main frame 10 includes a transfer roller 12 for transferring the optical disc inserted into the optical disc player to the inside of the optical disc player, and a connecting gear unit 13 for transferring the driving force of the loading motor 11 to the transfer roller 12 and the slider 40. The connecting gear unit 13 includes a slider-driving gear 13a selectively connected to a rack gear 41 of the slider 40 such that the slider 40 can receive or not receive the driving force of the loading motor 11, depending on where the slide 40 is positioned. The main frame 10 includes an optical pickup (not shown) for recording and reproducing information onto/from the optical disc and a chucking device (not shown) for chucking the optical disc onto a turntable when the optical disc has traveled to the chucking position.

When the optical disc has entered into the main frame 10, the guide lever mechanism 100 guides the optical disc to the chucking position, and when the optical disc reaches the chucking position, the guide lever mechanism 100 moves the slider 40 by a predetermined distance using the connector 50 such that the slider 40 receives the driving force of the loading motor 11. As used herein, the term "chucking position" refers to the place where the loading of the optical disc is finished and is the position in which recording and reproducing information onto and from the loaded optical disc takes place. Meanwhile, the slider 40, moved by the loading motor 11, interacts through the connector 50 with the guide lever mechanism 100 such that guide protrusions 101 are spaced apart from the optical disc at the chucking position so that the loaded optical disc can be freely rotated by the turntable (not shown).

The guide lever mechanism 100 includes a first guide lever 110 that is pushed back and rotated by the optical disc as the optical disc enters the optical disc player, and a second guide lever 120 that rotates in association with the first guide lever 110. The first guide lever 110 and the second guide lever 120 respectively have the guide protrusions 101 that interfere with the entered optical disc and that precisely guide the optical disc to the chucking position.

The first guide lever 110 and the second guide lever 120 each have teeth 102 formed in the their facing ends, respectively, to engage the first guide lever 110 and the second guide lever 120 to each other such that the first guide lever 110 and the second guide lever 120 rotate in association with each other. One of the guide levers 110 and 120 is connected to a spring 103 that elastically biases the first guide lever 110 and the second guide lever 120 to contact the entering optical disc. FIG. 1 shows an example in which the spring 103 is connected to the second guide lever 120.

The connector 50 is disposed between the first guide lever 110 and the slider 40 to move as a seesaw such that the slider 40 linearly moves in association with the movement of the first guide lever 110 and the first guide lever 110 rotates in association with the slider 40. The connector 50 is installed in the base plate 20 to translate in order to perform the same movements as described above with respect to the optical disc 1 having the first diameter and the optical disc 2 having the second diameter.

The connector 50 includes a rotation shaft 51 that protrudes from approximately the central portion thereof and that is inserted into a first longitudinal hole 21 formed in the base plate 20 and extending in the Y-direction, and a cam protrusion 53 that protrudes from one end 52 toward the first guide lever 110 and inserted into a cam slit 111 formed in the first guide lever 110. The cam slit 111 of the first guide lever 110 into which the cam protrusion 53 inserts includes a first slit portion 111a, a second slit portion 111b, and a third slit portion 111c, which are communicated with each other.

The first slit portion 111a interacts with the cam protrusion 53 when the first optical disc 1, which has a relatively smaller diameter, is loaded, the second slit portion 111b interacts with the cam protrusion 53 when the second optical disc 2, which has a relatively larger diameter (that is, the second diameter) is loaded, and the third slit 111c portion enables the cam protrusion 53 to move from the first slit portion 111a to the second slit portion 111b when the second optical disc 2 is loaded. Here, the interaction of the cam protrusion with the first slit portion 111a and the second slit portion 111b will be described in detail as follows. As an initial condition, the cam protrusion 53 is located in the first slit portion 111a, when the first optical disc 1 enters the optical disc player. As the first optical disc interacts with the guide protrusions 101, and the first guide lever 110 rotates at a predetermined angle in a predetermined direction, the cam protrusion 53 is moved in the X1-direction by the first guide lever 110 at the first slit 111a portion to rotate the connector 50 in the D-direction (See FIG. 5). When the connector 50 is rotated by a predetermined angle in the D-direction by the slider 40, the cam protrusion 53 moves in the X1-direction and the first guide lever 110 is rotated in the C-direction by the action of the cam protrusion at the first slit 111a portion (See FIG. 6). Such movements are similarly generated by the cam protrusion 53 and the second slit portion 111b.

The opposite end 54 of the connector 50 is inserted into a slider recess 42 formed in the slider 40 such that the connector 50 interacts with the slider 40. In other words, when the optical disc 1 enters the optical disc player to rotate the first guide lever 110 and the connector 50, the opposite end 54 of the connector 50 pushes a side 42a of the slider recess 42 such that the slider 40 moves by a predetermined distance in the X2-direction and the rack gear 41 of the slider 40 becomes engaged with the slider-driving gear 13a, which is driven by the loading motor 11 to move the slider 40 even more in the X2-direction. The further movement of the slider in the X2-direction causes the opposite end 54 of the connector 50 to be pushed back to an opposite side 42b of the slider recess 42, which causes the connector 50 to rotate even more in the D-direction, which causes the first guide lever 110 to be rotated even more in the C-direction by the cam protrusion 53 of the one end 52 of the connector 50 so that the guide protrusions 101 of the guide lever mechanism 100 is spaced apart from the optical disc.

Meanwhile, the connector 50 is connected to the spring 55 for elastically biasing the connector 50 in the C-direction.

The locking lever 30 is installed in the base plate 20 to rotate and to translate in the X-direction. Particularly, the locking lever 30 is enabled to translate so that the locking lever 30 more easily releases the first guide lever 110 when the loading of the optical disc is finished. As such, for the rotation and the translation, the locking lever 30 includes the rotation shaft 31 that protrudes toward the base plate 20 and is inserted into a second longitudinal hole 22 formed in the base plate 20.

Figure 6:
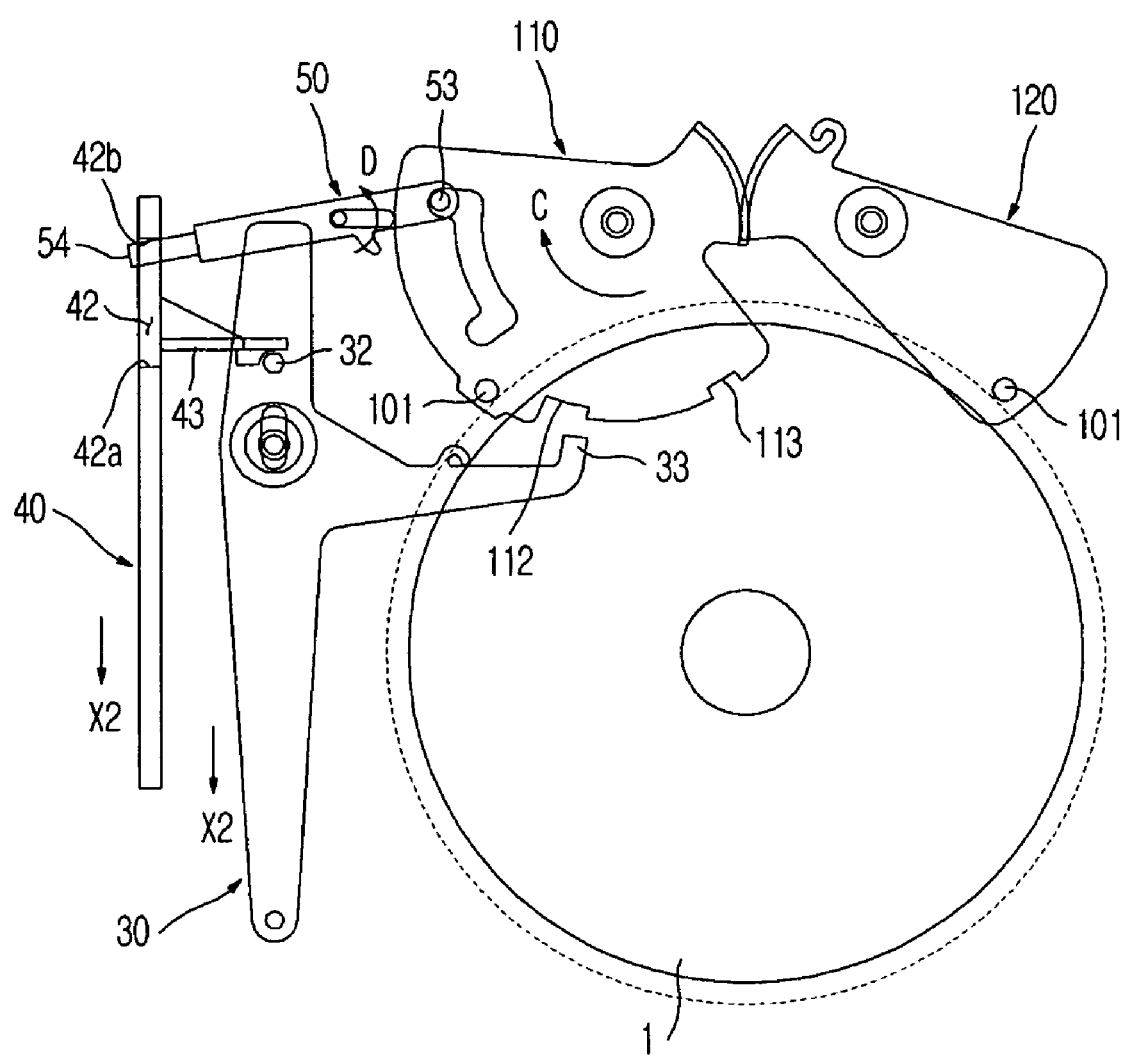

The translation of the locking lever 30 is generated by the slider 40. For accomplishing this, the slider 40 includes a protrusion 43 that protrudes toward the locking lever 30 and the locking lever 30 has a first interfering pin 32 to interact or interfere with the protrusion 43. Thus, as the slider 40 moves in the X2-direction, the protrusion 43 pushes the first interfering pin 32 in the X2-direction to move the locking lever 30 so that the first guide lever 110 smoothly rotates in the C-direction and the guide protrusions 101 are spaced apart from the optical disc positioned at the chucking position. The dotted line circumferential to the optical disc 1 in FIG. 6 shows the clearance provided by the guide protrusions 101 when spaced apart from the optical disc 1.

The locking lever 30 further includes a locking protrusion 33 for restricting the movement of the first guide lever 110, and the first guide lever 110 includes a first locking recess 112, formed in the circumference of the first guide lever 110, into which the locking protrusion 33 is inserted to determine the chucking position of the first optical disc 1, and a second locking recess 113 into which the locking protrusion 33 is inserted to determine the chucking position of the second optical disc 2 when the first guide lever 110 further rotates in the C-direction. In the initial state in which the optical disc is not inserted, the locking protrusion 33 is engaged with the first locking recess 112 to restrict the movement of the first guide lever 110. As can be seen by comparing FIG. 4 and FIG. 5, the movement of the first guide lever 110 is not entirely prevented when the locking protrusion 33 is inserted into the locking recess 112, but rather the first locking recess 112 enables the first guide lever 110 to rotate by a predetermined angle. When the first optical disc 1 enters the optical disc player and interacts with the guide protrusions 101, the first guide lever 110 rotates by the predetermined angle, which is sufficient for the slider 40 to become engaged with the loading motor 11 via the connector 50.

When the second optical disc 2, which has a (relatively larger) diameter, is loaded, the guide lever mechanism 100 must be rotated further than when the optical disc 1 having the first diameter is loaded. In other words, the guide lever mechanism 100 must be rotated so that the guide protrusions 101 are spaced farther apart in order to accommodate the second optical disc 2 and in order to guide the second optical disc 2 to the chucking position. Thus, before the second optical disc 2 enters and contacts the guide protrusions 101 of the guide lever mechanism 100, the locking lever 30 for restricting the movement of the first guide lever 110 must be released from the first guide lever 110, and the cam protrusion 53 inserted into the first slit 111a must be moved toward the third slit 111c.

To accomplish the configuration changes necessary to accommodate the disc having the second diameter, the locking lever 30 includes a second interfering pin 35 that protrudes from one end 34 of the locking lever 30 to interfere with the optical disc 2 having the second diameter when the optical disc enters the optical disc player and before the optical disc interacts with the guide protrusions 101. When the second interfering pin 35 interferes with the entering optical disc 2 having the second diameter, the locking lever 30 rotates in the C-direction and the locking protrusion 33 of the locking lever is separated from the first locking recess 112 of the first guide lever 110. Moreover, as the locking lever 30 rotates in the C-direction, the opposite end 36 of the locking lever 30 extends toward the connector 50 to interact with the rotation shaft 51 of the connector 50.

The locking lever 30 is connected to a spring 37 that elastically biases the locking lever 30 in the direction where the guide lever mechanism 100 is locked.

Figure 4:
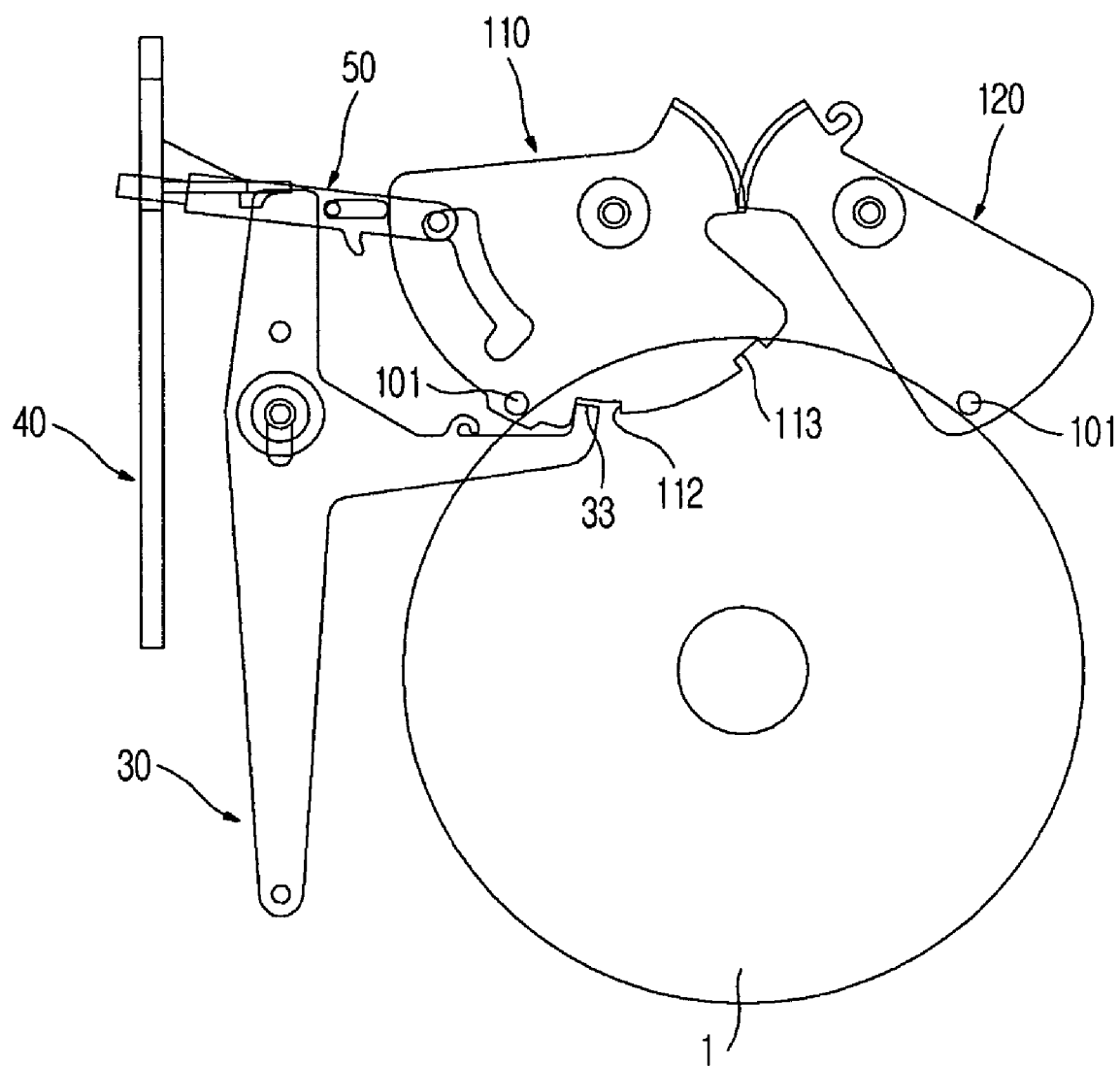
FIGS. 4 to 6 are views illustrating the loading of a first optical disc, an 80 mm optical disc, in the disc loading apparatus according to FIGS. 1 to 3.
Figure 5:
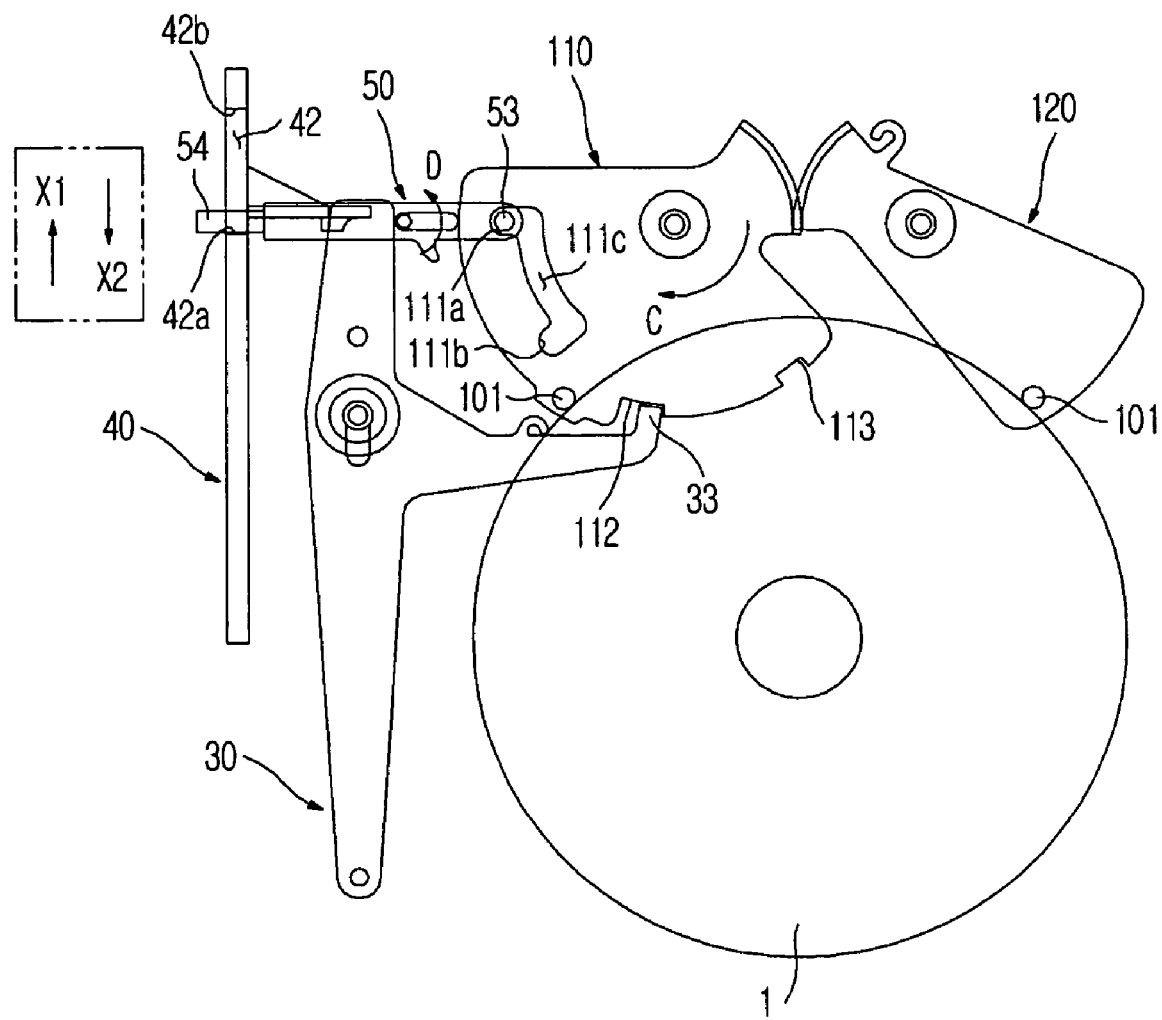

FIGS. 4 to 6 are views illustrating the loading of the 80 mm optical disc, in the disc loading apparatus according to an embodiment of the present invention, and FIGS. 7 to 10 are views illustrating the loading of the 120 mm optical disc, in the disc loading apparatus according to another embodiment of the present invention.

Firstly, the loading of the 80 mm optical disc, also referred to herein as first optical disc 1, will be described in detail. As shown in FIG. 1, when the first optical disc 1 enters the main frame 10 in the loading direction, that is, in the X1-direction, a sensor (not shown) detects the entrance of the first optical disc 1 to drive the loading motor 11. Then, the transfer roller 12 rotates and the first optical disc 1 further enters toward the chucking position.

The entering first optical disc 1, as shown in FIG. 4, contacts the guide protrusions 101 of the first guide lever and second guide lever 120 to be guided to the chucking position, and as shown in FIG. 5, pushes the guide protrusions 101 to rotate the first guide lever 110 by a predetermined angle in the C-direction. The position at this time becomes the chucking position of the first optical disc 1. Meanwhile, as the first guide lever 110 rotates by the predetermined angle, the cam protrusion 53 inserted into the first slit portion 111a of the first guide lever 110 moves in the X1-direction and the connector 50 rotates in the D-direction. When the connector 50 rotates, the opposite end 54 of the connector 50 pushes the side 42a of the slider recess 42 to slightly move the slider 40 in the X2-direction. Then, the rack gear 41 of the slider 40 becomes engaged with the driving gear 13a, which had been rotating without load, such that the slider 40 receives the driving force of the loading motor 11, which causes the slider 40 to move in the X2-direction (See FIG. 2).

As shown in FIG. 6, when the first optical disc 1 reaches the chucking position, the guide protrusions 101 of the guide lever mechanism must be spaced apart from the first optical disc 1 such that the first optical disc 1 can freely rotate during the recording and the reproducing onto and from the first optical disc 1. Such movements are performed according to the movement of the slider 40 in the X2-direction. When the slider 40 further moves in the X2-direction, the protrusion 43 of the slider 40 contacts the first interfering pin 32 of the locking lever 30 to move the locking lever 30 by a predetermined distance in the X2-direction. Then, the locking protrusion 33 of the locking lever 30 becomes separated from the first locking recess 112. At the same time, as the slider 40 moves, the opposite side 42b of the slider recess 42 interferes with the opposite end 54 of the connector 50 to rotate the connector 50 even further in the D-direction. The rotation of the connector 50 causes the first guide lever 110 to rotate even further in the C-direction, which causes the guide protrusions 101 of the first guide lever 110 and the second guide lever 120 to be spaced apart from the first optical disc 1.

By doing so, the loading of the first optical disc 1 is finished and the first optical disc 1 is rotated by the turntable to record and reproduce information onto and from the optical disc 1. Meanwhile, the unloading of the first optical disc 1 is reversely operated.

Next, the loading of the 120 mm optical disc, also referred to herein as the second optical disc 2 will be described. As in the above description, as shown in FIG. 1, when the second optical disc 2 enters the main frame 10, the second optical disc 2 is further moved toward the chucking position by the transfer roller 12.

Figure 7:
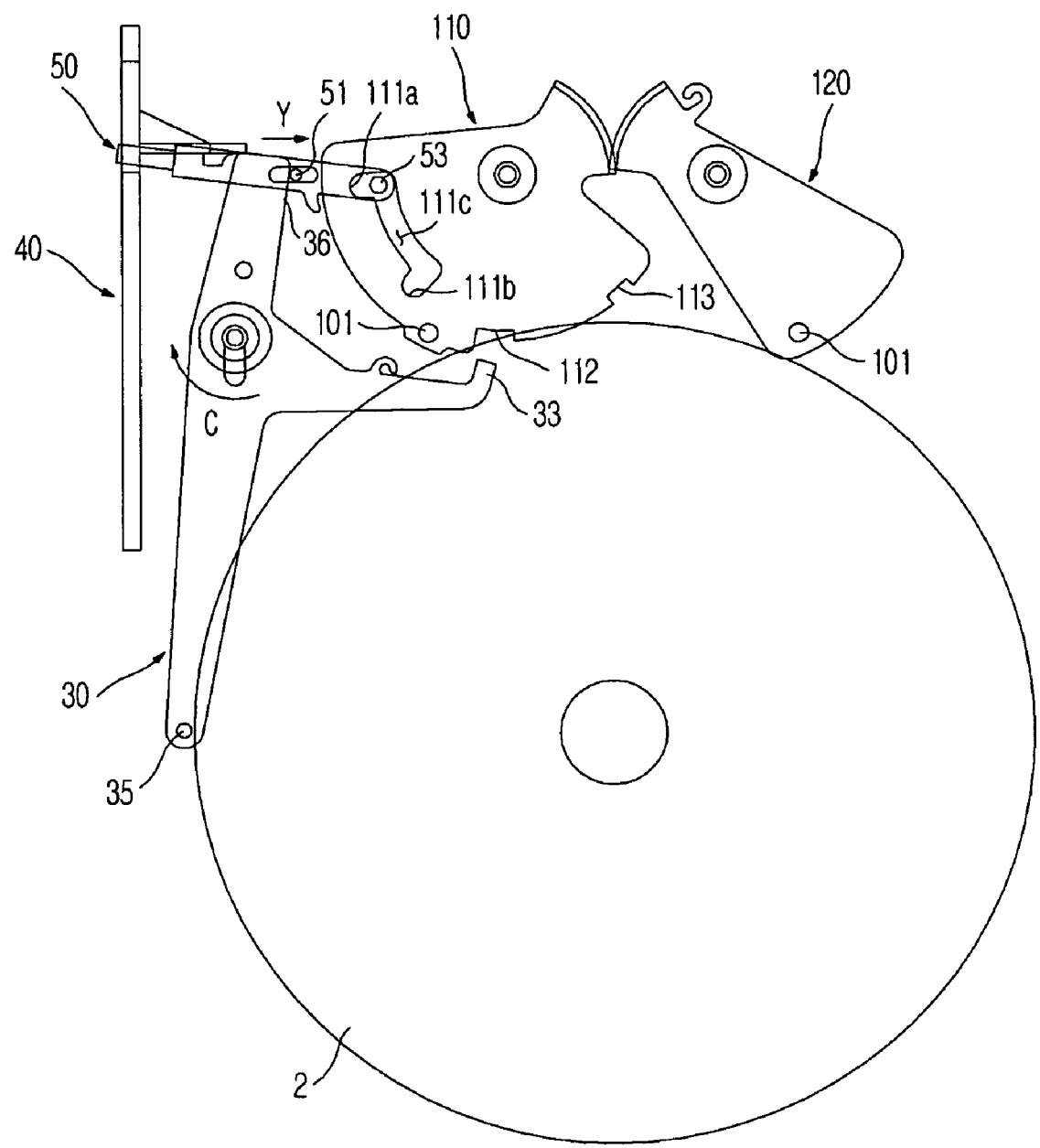
FIGS. 7 to 10 are views illustrating the loading of a second optical disc, an 120 mm optical disc, in the disc loading apparatus according to FIGS. 1 to 3.

As shown in FIG. 7, the entering second optical disc 2 pushes the second interfering pin 35 of the locking lever 30 to rotate the locking lever 30 in the C-direction. Then, the locking protrusion 33 escapes from the first locking recess 112 of the first guide lever 110 to release the guide lever mechanism 100, and at the same time, the opposite end 36 of the locking lever 30 pushes the rotation shaft 52 of the connector 50 in the Y-direction such that the cam protrusion 53 of the connector 50 moves from the first slit portion 111a to the third slit portion 111c and the guide lever mechanism 100 can freely rotate.

Figure 8:
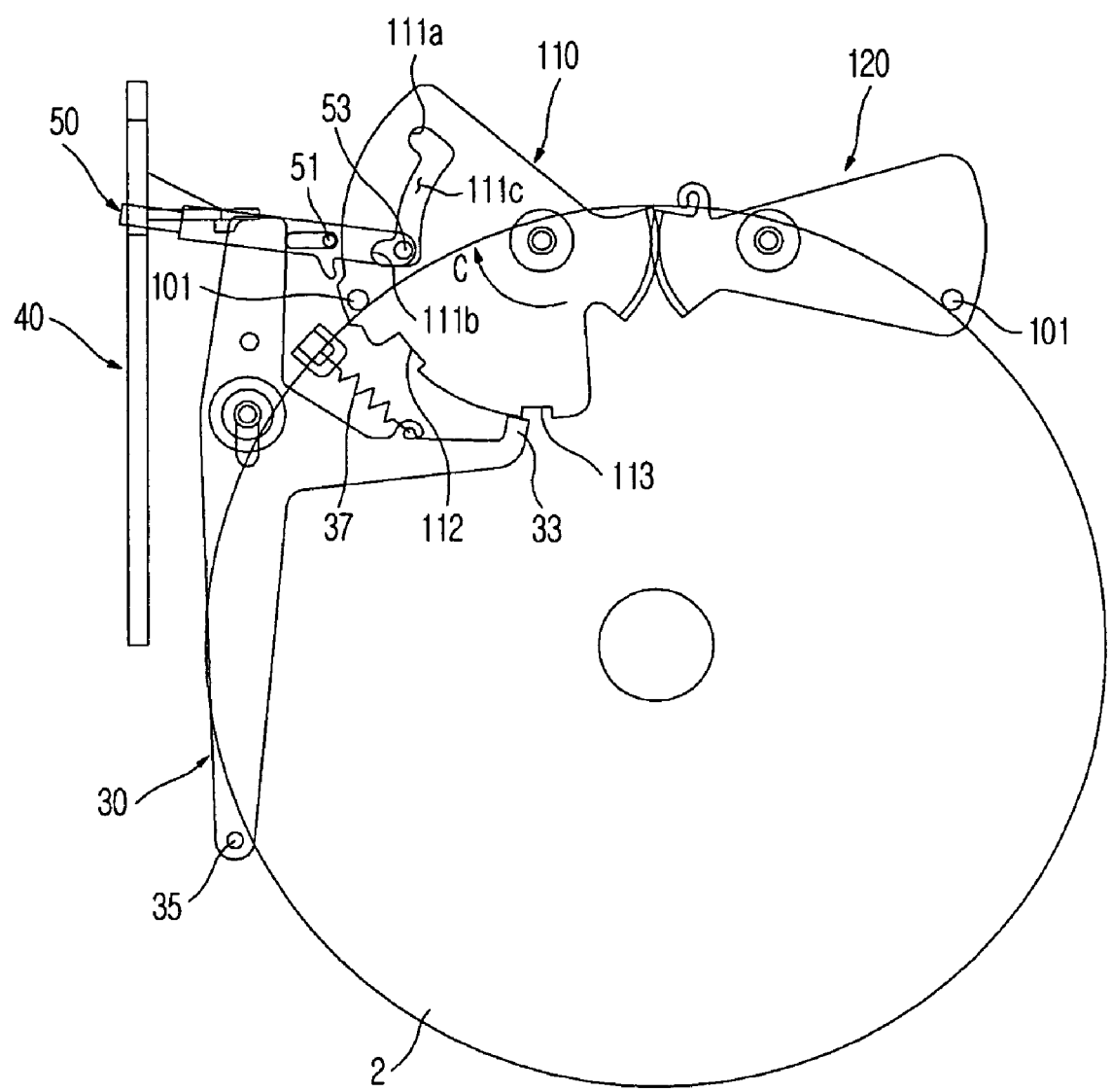

In this state, when the second optical disc 2 further enters, the second optical disc 2 contacts the guide protrusion 101 of the guide lever mechanism 100 to be guided to the chucking position, and as shown in FIG. 8, to rotate the first guide lever 110 by a predetermined angle in the C-direction. FIG. 8 illustrates the state directly before the second optical disc 2 reaches the chucking position. At that time, the cam protrusion 53 of the connector 50 moves along the third slit portion 111c and eventually reaches the second slit portion 111b, the locking protrusion 33 of the locking lever 30 reaches near the second locking recess 113 of the first guide lever 110, and the locking lever 30 is returned to the initial position due to the elastic force of the spring 37.

Figure 9:
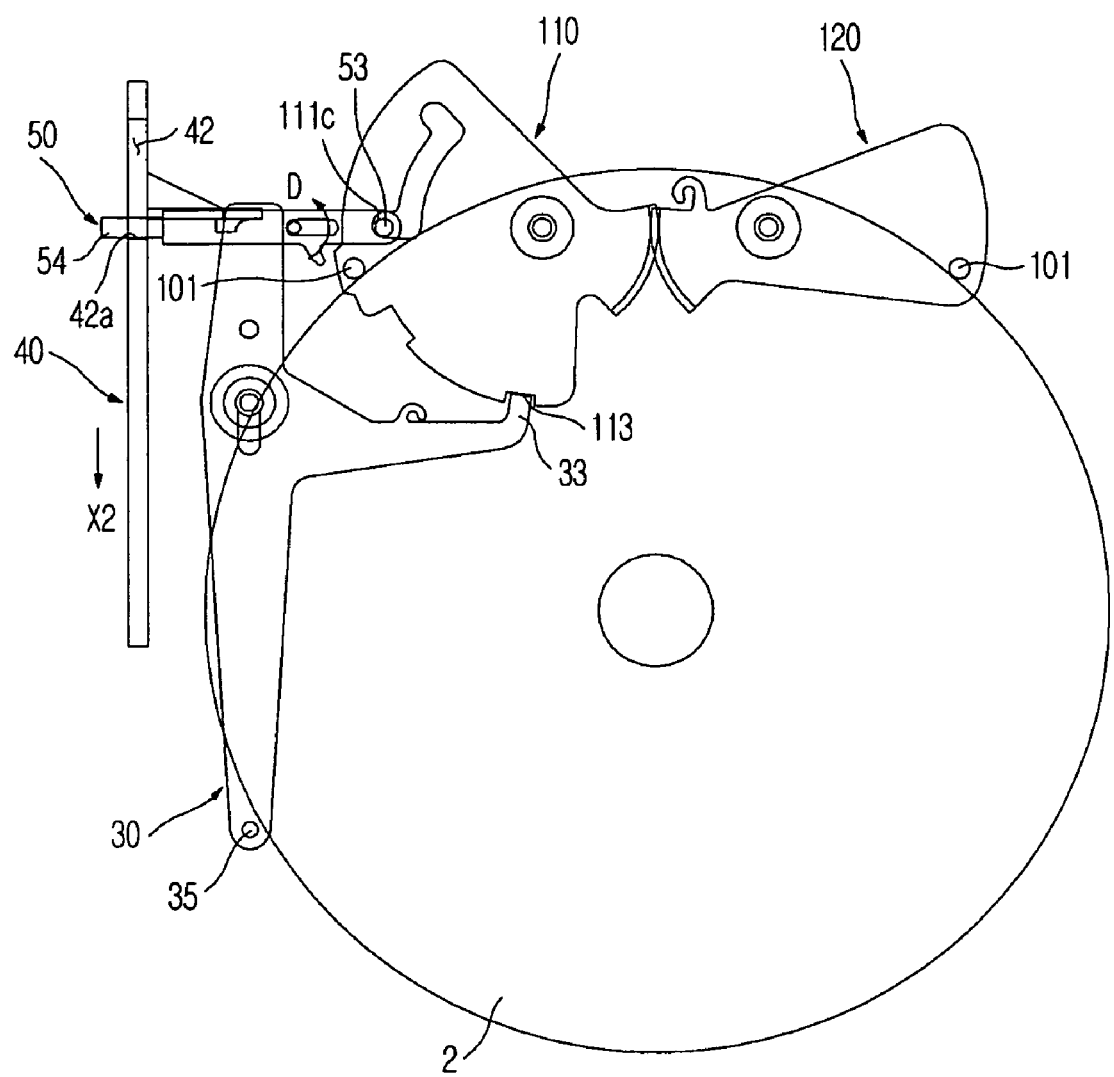

As shown in FIG. 9, when the second optical disc 2 further enters and reaches the chucking position, the locking protrusion 33 is inserted into the second locking recess 113 to restrict the movement of the guide lever mechanism 100. At the same time, the cam protrusion 53 is pushed back by the third slit portion 111c and the connector 50 rotates in the D-direction. By doing so, the opposite end 54 of the connector 50 pushes the side 42a of the slider recess 42 and slightly moves the slider 40 in the X2-direction. Then, the rack gear 41 of the slider 40 is engaged with the driving gear 13a, which had been rotating without load, such that the slider 40 receives the driving force of the loading motor 11 and moves in the X2-direction.

Figure 10:
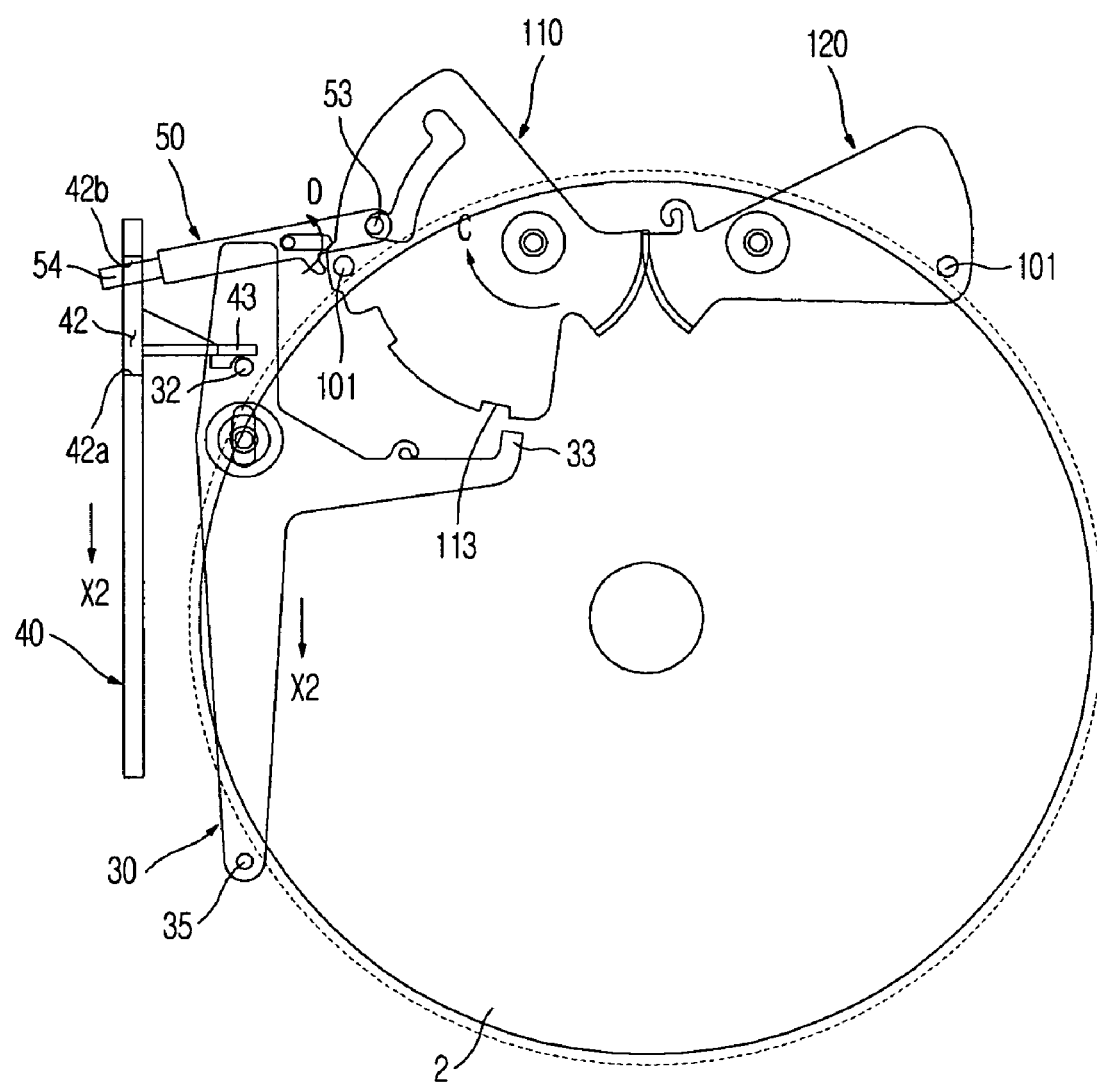

The movements after this are identical to the loading of the first optical disc 1. In other words, as shown in FIG. 10, as the slider 40 moves, the locking lever 30 moves in the X2-direction and releases the guide lever mechanism 100, the connector 50 rotates in the D-direction and rotates the first guide lever 110 in the C-direction such that the guide protrusions 101 of the guide lever mechanism 100 are spaced apart from the second optical disc 2 positioned at the chucking position. Then, the loading of the second optical disc 2 is finished.

Although the components of the optical disc loading apparatus are described with respect to a specific configuration and orientation, it is to be understood that other configurations and orientations are possible. For example, the description herein of components moving in a clockwise ("C-direction") and counterclockwise ("D-direction") are provided for clarity with respect to the particular embodiment shown in FIGS. 1-10, and are not to be understood as limiting. For example, an optical disc loading apparatus may be a mirror image of what is shown in FIGS. 1-10, in which case, the rotational directions would be the reverse of what is described herein.

As described above, according to the disc loading apparatus of an optical disc player in accordance with aspects of the present invention, a loading mechanism for discs with different sizes can be implanted with components having multiple functions, so that the number of the components is reduced and the productivity is increased. In other words, separate and duplicating components are not necessary to accommodate discs having different diameters.

Moreover, the disc loading apparatus according to aspects of the present invention is structured such that the components of the loading mechanism do not interfere with each other, so that steady loading and unloading of the optical disc can be achieved. Thus, the reliability of the disc loading apparatus is enhanced.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An optical disc loading apparatus of an optical disc player comprising a main frame in which a loading motor is installed to load an optical disc in a loading direction to a chucking position, wherein the optical disc is selectively either a first optical disc having a first diameter or a second optical disc having a second diameter greater than the first diameter, the disc loading apparatus comprising:
   a base plate;
   a guide lever mechanism rotatably installed in the base plate to guide the optical disc to the chucking position when the optical disc enters the optical disc player;
   a locking lever rotatably installed in the base plate to selectively lock and release the guide lever mechanism according whether the first disc or the second disc is loaded and according to the position where the optical disc is loaded;
   a slider installed in the main frame to reciprocate in the loading direction of the optical disc and in an unloading direction opposite to the loading direction, and to receive a driving force of the loading motor according to where the slider is positioned; and
   a connector installed to rotate and to translate with respect to the base plate in association with movement of the guide lever mechanism, the slider, and the locking lever,
   wherein at least one of the base plate and the connector includes a first rotation shaft and the other of the base plate and the connector includes a first longitudinal hole, such that the first rotation shaft rotates with respect to the first longitudinal hole when the connector rotates with respect to the base plate, and the first rotation shaft moves in a linear longitudinal direction within the first longitudinal hole when the connector translates with respect to the base plate.

2. The disc loading apparatus according to claim 1, wherein the guide lever mechanism comprises:
   a first guide lever that is selectively locked and released by the locking lever; and
   a second guide lever that rotates in association with the first guide lever;
   wherein the first guide lever and the second guide lever respectively have guide protrusions that guide the entering optical disc to the chucking position.

3. The disc loading apparatus according to claim 2, wherein the first guide lever acts upon the connector so that the connector induces the slider to move linearly.

4. The disc loading apparatus according to claim 3, wherein the slider acts upon the connector so that the connector induces the first guide lever to rotate such that the guide protrusion is spaced apart from the optical disc positioned at the chucking position.

5. The disc loading apparatus according to claim 4, wherein the connector comprises the rotation shaft that protrudes from a central portion thereof, and the base plate includes the first longitudinal hole in which the rotation shaft is inserted such that the connector rotates and translates in a direction perpendicular to the loading direction of the optical disc.

6. The disc loading apparatus according to claim 5, wherein the connector further comprises a cam protrusion that protrudes from one end thereof toward the first guide lever, and the first guide lever comprises a cam slit that engages with the cam protrusion such that the connector and the first guide lever rotate in association with each other.

7. The disc loading apparatus as claimed in claim 6, wherein the cam slit comprises:
   a first slit portion that interacts with the cam protrusion when the first optical disc is loaded;
   a second slit portion that interacts with the cam protrusion when the second optical disc is loaded; and
   a third slit portion formed between the first slit portion and the second slit portion such that the cam protrusion moves from the first slit portion to the second slit portion when the second optical disc is loaded.

8. The disc loading apparatus as claimed in claim 7, wherein the locking lever comprises a second interfering pin formed in one end thereof to interact with the second optical disc to rotate the locking lever in a direction wherein the first guide lever is released when the second optical disc enters the optical disc player.

9. The disc loading apparatus as claimed in claim 8, wherein an opposite end of the locking lever extends toward the connector and interacts with the connector when the locking lever rotates to move the cam protrusion from the first slit to the third slit such that the first guide lever is enabled to rotate.

10. The disc loading apparatus as claimed in claim 9, wherein the rotation shaft of the connector protrudes toward the locking lever to interact with the opposite end of the locking lever.

11. The disc loading apparatus as claimed in claim 6, wherein the slider comprises a slider recess into which an opposite end of the connector is inserted, and the opposite end of the connector pushes one side of the slider recess when the first guide lever and the connector rotate such that the slider receives the driving force of the loading motor, and is pushed to the opposite side of the slider recess as the slider moves to rotate the connector and the first guide lever.

12. The disc loading apparatus as claimed in claim 4, wherein the locking lever is installed to rotate and to translate.

13. The disc loading apparatus as claimed in claim 12, wherein at least one of the base plate and the locking lever includes a second rotation shaft and the other of the base plate and the locking lever includes a second longitudinal hole, such that the second rotation shaft rotates with respect to the second longitudinal hole when the locking lever rotates with respect to the base plate, and the second rotation shaft moves in a linear longitudinal direction within the second longitudinal hole when the locking lever translates with respect to the base plate.

14. The disc loading apparatus as claimed in claim 13, wherein the slider induces the first guide lever to rotate and the locking lever to translate such that the locking protrusion separates from the first guide lever.

15. The disc loading apparatus as claimed in claim 14, wherein the slider comprises a slider protrusion that protrudes toward the locking lever, and the locking lever comprises a first interfering pin that interacts with the slider protrusion as the slider moves.

16. The disc loading apparatus as claimed in claim 2, wherein the locking lever comprises a locking protrusion that restricts the first guide lever, and the first guide lever comprises:
  a first locking recess, provided in the circumference of the first guide lever, into which the locking protrusion is inserted to lock the first guide lever in a position that guides the first optical disc into the chucking position; and
  a second locking recess, spaced apart from the first locking recess, into which the locking protrusion is inserted to lock the first guide lever in a position that guides the second optical disc into the chucking position.

17. The disc loading apparatus as claimed in claim 16, wherein the first locking recess and the locking protrusion are structured such that the first guide lever rotates by a predetermined angle when the locking protrusion is inserted into the first locking recess.

18. The disc loading apparatus as claimed in claim 2, wherein one of the first guide lever and the second guide lever is connected to a spring to elastically bias the first guide lever and the second guide lever in a direction where the first guide lever and the second guide lever contact the entering optical disc.

19. The disc loading apparatus as claimed in claim 1, wherein the connector is connected to a spring for elastically biasing the connector in a direction where the earn protrusion is maintained in the first slit portion or the second slit portion.

20. The disc loading apparatus as claimed in claim 1, wherein the locking lever is connected to a spring that elastically biases the locking lever in the direction where the locking lever locks the first guide lever.

21. An optical disc loading apparatus of an optical disc player comprising a main frame in which a loading motor is installed to load an optical disc in a loading direction to a chucking position, wherein the optical disc is selectively either a first optical disc having a first diameter or a second optical disc having a second diameter larger than the first diameter, the disc loading apparatus comprising:
  a base plate;
  a guide lever mechanism rotatably installed in the base plate to guide the optical disc to the chucking position when the optical disc enters the optical disc player;
  a slider installed in the main frame to reciprocate, wherein the slider reacts to movement of the guide lever mechanism and a driving force of the loading motor and moves linearly when the optical disc reaches a loading finish position;
  a locking lever installed to rotate and to translate in the base plate to selectively lock and release the guide lever according to the position where the optical disc is loaded and in response to movement of the slider; and
  a connector installed to rotate and to translate in the base plate and moving in association with the guide lever mechanism, the slider, and the locking lever,
  wherein at least one of the base plate and the locking lever includes a first rotation shaft and the other of the base plate and the locking lever includes a first longitudinal hole, such that the first rotation shaft rotates with respect to the first longitudinal hole when the locking lever rotates with respect to the base plate, and the first rotation shaft moves in a linear longitudinal direction within the first longitudinal hole when the locking lever translates with respect to the base plate.

22. The optical disc loading apparatus of claim 21, wherein the guide lever mechanism comprises:
  a first guide lever that is selectively locked and released by the locking lever; and that comprises a first locking recess, provided in the circumference of the first guide lever, and a second locking recess, spaced apart from the first locking recess; and
  a second guide lever that counter-rotates in association with the first guide lever;
  wherein the first guide lever and the second guide lever respectively have guide protrusions that guide the entering optical disc to the chucking position.

23. The optical disc loading apparatus of claim 22, wherein the locking lever comprises a locking protrusion that restricts the first guide lever, wherein the locking protrusion inserts into the first locking recess to lock the first guide lever in a position that guides the first optical disc into the chucking position; and inserts into the second locking recess to lock the first guide lever in a position that guides the second optical disc into the chucking position.

24. The optical disc loading apparatus of claim 23, wherein the locking lever comprises a interfering pin formed in one end thereof to interact with the second optical disc to rotate the locking lever in a direction wherein the first guide lever is released when the second optical disc enters the optical disc player.

25. An optical disc loading apparatus of an optical disc player that loads an optical disc in a loading direction to a chucking position, wherein the optical disc is selectively either a first optical disc having a first diameter or a second optical disc having a second diameter greater than the first diameter, the disc loading apparatus comprising:
  a base plate;
  a guide lever mechanism rotatably installed in the base plate, the guide lever mechanism including a first guide lever and a second guide lever that counter-rotates in association with the first guide lever;
  wherein the first guide lever and the second guide lever respectively have guide protrusions that guide an entering optical disc to the chucking position,
  a locking lever rotatably installed in the base plate to selectively lock and release the guide lever mechanism according whether the first disc or the second disc is loaded;
  a slider to receive a driving force of a loading motor according to a position of the slider; and
  a connector installed to rotate and to translate with respect to the base plate in association with movement of the guide lever mechanism, the slider, and the locking lever,
  wherein the guide lever mechanism rotates between a first position to which the guide lever mechanism is biased when no disc is inserted, a second position in which the guide protrusions interfere with the first optical disc to guide the first optical disc to the chucking position, a third position in which the guide protrusions are spaced apart from the first optical disc in the chucking position, a fourth position in which the guide protrusions interfere with the second optical disc to guide the second optical disc to the chucking position and a fifth position wherein the guide protrusions are spaced apart from the second optical disc in the chucking position, wherein in the first and second position, a locking projection of the locking lever locks the guide lever mechanism in a first locking recess in the first guide lever and wherein in the fourth position, the locking projection locks the guide lever mechanism in a second locking recess wherein if the first optical disc is loaded, the first optical disc moves the guide lever mechanism from the first position to the second position, wherein the first guide lever moves the connector which moves the slider to receive a driving force of the loading motor, which moves the slider, which moves the locking lever to unlock the locking lever from the first locking recess of the first guide lever and moves the connector, which moves the guide lever mechanism to the third position and wherein if a second optical disc is loaded, the second optical disc interacts with the locking lever to unlock the locking lever from the first guide lever and moves the guide lever mechanism from the first position to the fourth position, wherein the first guide lever moves the connector which moves the slider to receive a driving force of the loading motor, which moves the slider, which moves the locking lever to unlock the locking lever from the second locking recess of the first guide lever and moves the connector, which moves the guide lever mechanism to the fifth position.

26. The optical disc apparatus of claim 25, wherein the connector comprises a cam protrusion that protrudes from one end thereof toward the first guide lever, and wherein the first guide lever comprises a cam slit that engages with the cam protrusion, wherein the cam slit comprises:

a first slit portion that interacts with the cam protrusion when the first optical disc is loaded and the guide lever mechanism is in the first, second or third position;

a second slit portion that interacts with the cam protrusion when the second optical disc is loaded and when the guide lever mechanism is in the fourth or fifth position; and a third slit portion formed between the first slit portion and the second slit portion such that the cam protrusion moves from the first slit portion to the second slit portion when guide lever moves from the third to the fourth position as the second optical disc is loaded.

27. An optical disc loading apparatus of an optical disc player comprising a main frame in which a loading motor is installed to load an optical disc in a loading direction to a chucking position, wherein the optical disc is selectively either a first optical disc having a first diameter or a second optical disc having a second diameter greater than the first diameter, the disc loading apparatus comprising:

a base plate;

a guide lever mechanism rotatably installed in the base plate to guide the optical disc to the chucking position when the optical disc enters the optical disc player, the guide lever mechanism including a first guide lever and a second guide lever that rotates in association with the first guide lever;

a locking lever rotatably installed in the base plate to selectively lock and release the guide lever mechanism according whether the first disc or the second disc is loaded and according to the position where the optical disc is loaded;

a slider installed in the main frame to reciprocate in the loading direction of the optical disc and in an unloading direction opposite to the loading direction, and to receive a driving force of the loading motor according to where the slider is positioned; and a connector installed to rotate and to translate with respect to the base plate in association with movement of the guide lever mechanism, the slider, and the locking lever, wherein the connector further comprises a cam protrusion that protrudes from one end thereof toward the first guide lever, and the first guide lever comprises a cam slit that engages with the cam protrusion such that the connector and the first guide lever rotate in association with each other.

* * * * *